United States Patent
Otsuka

(10) Patent No.: US 8,205,041 B2
(45) Date of Patent: Jun. 19, 2012

(54) VIRTUAL TAPE APPARATUS, CONTROL METHOD OF VIRTUAL TAPE APPARATUS, AND CONTROL SECTION OF ELECTRONIC DEVICE

(75) Inventor: Hiroshi Otsuka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 134 days.

(21) Appl. No.: 12/857,060

(22) Filed: Aug. 16, 2010

(65) Prior Publication Data

US 2010/0306462 A1    Dec. 2, 2010

Related U.S. Application Data

(63) Continuation of application No. PCT/JP2008/058265, filed on Apr. 30, 2008.

(51) Int. Cl.
*G06F 13/10*    (2006.01)
(52) U.S. Cl. ............ 711/111; 711/156; 711/E12.001
(58) Field of Classification Search ............ 711/111, 711/156
See application file for complete search history.

(56) References Cited

U.S. PATENT DOCUMENTS

| | | | | |
|---|---|---|---|---|
| 2003/0065882 | A1* | 4/2003 | Beeston et al. | 711/111 |
| 2006/0104613 | A1* | 5/2006 | Kunii | 386/94 |
| 2006/0143423 | A1 | 6/2006 | Sasage | |

FOREIGN PATENT DOCUMENTS

| | | |
|---|---|---|
| JP | 3-29166 | 2/1991 |
| JP | 7-272409 | 10/1995 |
| JP | 9-274540 | 10/1997 |
| JP | 2006-189976 | 7/2006 |

OTHER PUBLICATIONS

English Translation of the International Preliminary Report on Patentability issued Dec. 13, 2010 in corresponding International Patent Application PCT/JP2008/058265.

* cited by examiner

*Primary Examiner* — Kenneth Lo
(74) *Attorney, Agent, or Firm* — Staas & Halsey LLP

(57) ABSTRACT

A virtual tape apparatus is interposed between a host and a tape device so as to store data transmitted from the host to a logical tape volume. The virtual tape apparatus includes: a data communication unit that receives data transmitted from the host; a RAID device having a logical tape volume for storing the data; a management table that manages attribute information of data stored in the physical tape volume; a position determination section that determines the write starting position of the data stored in the logical tape volume on the physical tape volume based on the management table; and a drive control unit that writes data in the logical tape volume to the physical tape volume based on a result of the determination.

12 Claims, 6 Drawing Sheets

FIG. 4

LOGICAL VOLUME DATA IN ONE PHYSICAL TAPE

| Status | LOGICAL VOLUME NAME | Block NUMBER | SIZE (byte) | TIME STAMP | VERSION NUMBER |
|---|---|---|---|---|---|
| invalid | LV000A | 2 | 16544 | 2008-1-1 10:24:22 | 1 |
| invalid | LV000B | 5 | 16544 | 2008-1-1 10:24:23 | 1 |
| invalid | LV000C | 8 | 16544 | 2008-1-1 10:24:23 | 1 |
| invalid | LV000A | 11 | 848550 | 2008-3-7 08:10:05 | 2 |
| valid | LV000C | 14 | 848707 | 2008-3-8 02:02:03 | 2 |
| valid | LV000A | 17 | 849555 | 2008-3-8 13:02:50 | 3 |
| invalid | LV000B | 20 | 851448 | 2008-5-3 17:40:05 | 2 |
| invalid | LV000B | 23 | 850272 | 2008-5-10 17:41:01 | 3 |
| valid | LV000B | 26 | 852725 | 2008-5-17 17:40:30 | 4 |
| | | | | | |

FIG. 5

| Status | LOGICAL VOLUME NAME | Block NUMBER | SIZE (byte) | TIME STAMP | VERSION NUMBER |
|---|---|---|---|---|---|
| invalid | LV000A | 2 | 16544 | 2008-1-1 10:24:22 | 1 |
| invalid | LV000B | 5 | 16544 | 2008-1-1 10:24:23 | 1 |
| invalid | LV000C | 8 | 16544 | 2008-1-1 10:24:23 | 1 |
| invalid | LV000A | 11 | 848550 | 2008-3-7 08:10:05 | 2 |
| valid | LV000C | 14 | 848707 | 2008-3-8 02:02:03 | 2 |
| valid | LV000A | 17 | 849555 | 2008-3-8 13:02:50 | 3 |
| invalid | LV000B | 20 | 851448 | 2008-5-3 17:40:05 | 2 |
| invalid | LV000B | 23 | 850272 | 2008-5-10 17:41:01 | 3 |
| invalid | LV000B | 26 | 870271 | 2008-5-17 17:40:30 | 4 |
| valid | LV000B | 20 | 992709 | 2008-5-24 17:40:01 | 5 |
| | | | | | |

VIRTUAL TAPE APPARATUS, CONTROL METHOD OF VIRTUAL TAPE APPARATUS, AND CONTROL SECTION OF ELECTRONIC DEVICE

CROSS-REFERENCE TO RELATED APPLICATIONS

This application is a continuation application, filed under 35 U.S.C. §111(a), of PCT Application No. PCT/JP2008/058265, filed Apr. 30, 2008, the disclosure of which is herein incorporated in its entirety by reference.

FIELD

The present invention relates to a technique of a virtual tape device for backing up data.

BACKGROUND

Backup processing of business data to a physical tape volume is performed on a routine basis. To shorten the backup processing, there is known a virtual tape device that uses a RAID (Redundant Arrays of Inexpensive Disks) device, which is a magnetic disk device of a RAID structure, as a cache of data to be stored in a physical tape volume.

As a prior art relating to the present invention, the following documents have been disclosed.

[Patent Document 1] Japanese Laid-Open Patent Publication No. 7-272409
[Patent Document 2] Japanese Laid-Open Patent Publication No. 9-274540

SUMMARY

According to an aspect of the present invention, there is provided a virtual tape apparatus interposed between a host and a library device that makes an access to a physical tape volume so as to store data transmitted from the host to a logical tape volume, including: a data reception section that receives data transmitted from the host; a storage device having a logical tape volume for storing the data; a management table that retains attribute information of data stored in the physical tape volume; a write starting position determination section that determines the write starting position of the data stored in the logical tape volume on the physical tape volume, the write starting position determination section determining, out of data that have been written in the physical tape volume, data that has been invalidated and data to become invalidated through the current write processing based on the attribute information retained in the management table and determining the next position of valid data which is located at the endmost side among valid data stored in the physical tape volume as the write starting position; and a write processing section that writes data in the logical tape volume to the physical tape volume based on a result of the determination.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is a view illustrating an example of a management table in which data of the latest version has not yet been registered;

FIG. 5 is a view illustrating an example of the management table in which data of the latest version has been registered;

DESCRIPTION OF EMBODIMENT(S)

Figure 7:
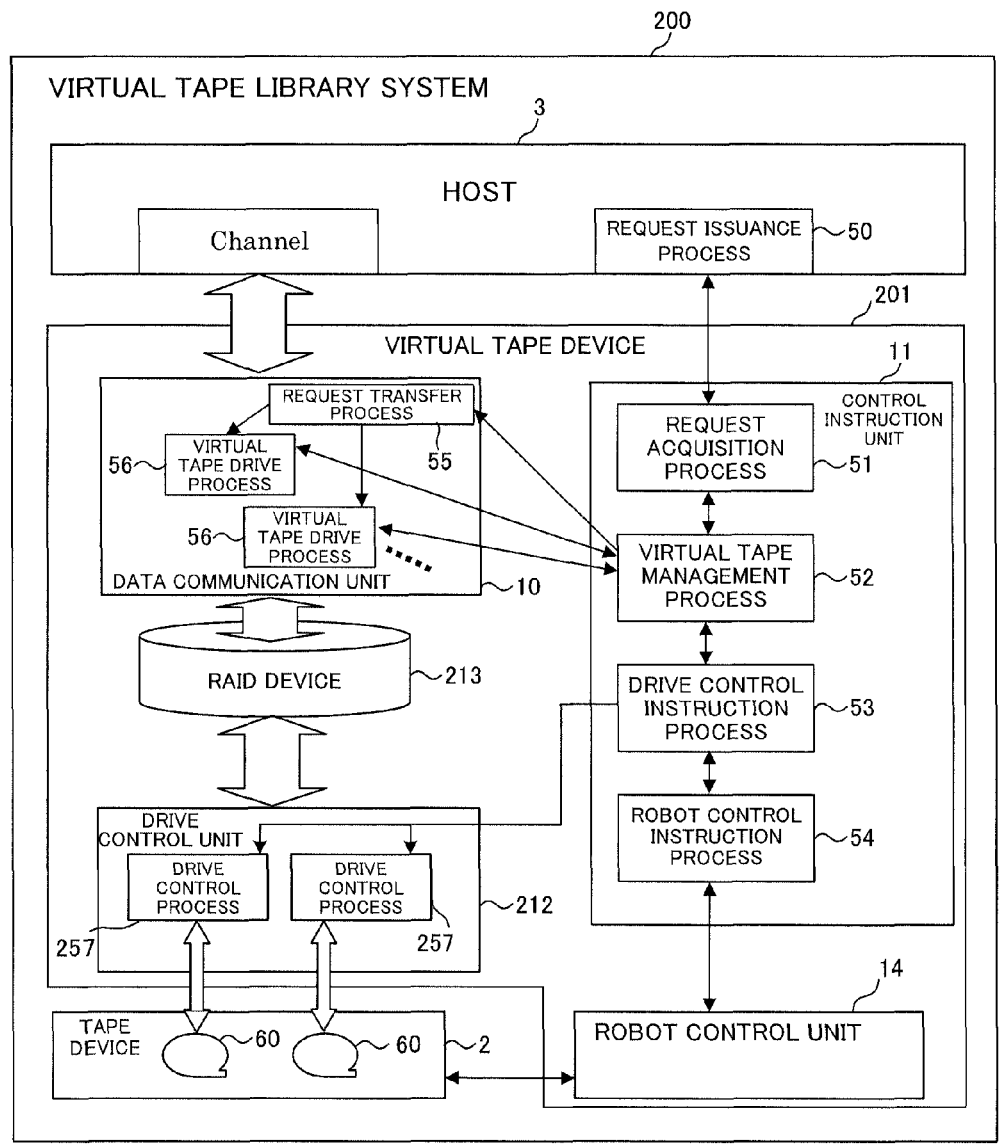
FIG. 7 is a view illustrating an example of a configuration of a conventional virtual tape library system.

A conventional virtual tape library system is illustrated in FIG. 7. A conventional virtual tape library system 200 includes a virtual tape device 201, a host 3, and a tape device 2.

The virtual tape device 201 includes a data communication unit 10, a drive control unit 212, a control instruction unit 11, a RAID device 213, and a robot control unit 14. The data communication unit 10, drive control unit 212, control instruction unit 11, and robot control unit 14 are each a server having hardware resources such as a CPU (Central Processing Unit), a memory, and the like. A plurality of processes (programs) communicate with one another between the servers using pipes and sockets to realize the virtual tape device 201.

The units and processes operating in the respective units will be described.

The data communication unit 10 is a server that takes charge of a connection with a drive path (Channel) of the host 3. The data communication unit 10 executes a virtual tape drive process 56 that makes the host 3 virtually recognize a later described logical tape volume in the RAID device 201 as a physical tape volume and a request transfer process 55 that relays a request from a later described virtual tape management process 52 to the virtual tape drive process 56. Note that the data communication unit 10 can simultaneously execute multiple virtual tape drive processes 56.

The drive control unit 212 is a server that takes charge of a connection with a drive of the tape device 2. The drive control unit 212 executes a drive control process 257 that exchanges data with each physical tape drive.

The robot control unit 14 is a server that takes charge of controlling the operation of a robot arm of the tape device 2 and issues a control request such as a request of exchanging a physical tape stored in a physical tape library.

The control instruction unit 11 is a server that cooperates with the drive control unit 212 and robot control unit 14, in which various processes for making external devices or units recognize the logical tape volume as a system operate. The control instruction unit 11 executes a MOUNT request from the host 3 to the logical tape drive and a request acquisition process 51 that receives information acquisition request, etc. Further, the control instruction unit 11 executes a virtual tape management process 52 which is a process that takes charge of controlling virtual and logical processing and a drive control instruction process 53 which is a process that takes charge of controlling physical processing.

In addition, the control instruction unit 11 executes a robot control instruction process 54 that makes a control instruction for the robot control unit 14.

The RAID device 213 is a magnetic disk drive (storage device) having a RAID configuration in which data to be stored in the physical tape volume is temporarily stored. Areas obtained by logically dividing the storage area of the RAID device 213 are configured as logical tape volumes.

The host 3 is a main frame that manages and controls the virtual tape device 201. A request issuance process 50 executed in the host 3 is a process that issues a request to the virtual tape device 201.

The outline of processing performed in the virtual tape library system 200 will be described.

Upon issuance of a Write request from the host 3, user data is stored in the logical tape volume on the RAID device 213 through the virtual tape drive process 56 of the data communication unit 10. After that, the drive control process 257 on the drive control unit 212 write the data to a physical tape volume 60 in the tape device 2 in an asynchronous manner with the access of the host 3.

Figure 8:
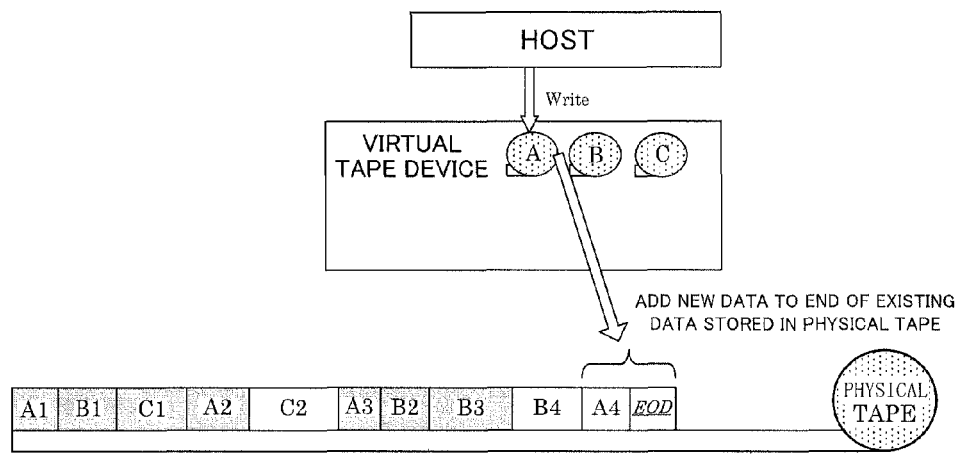
FIG. 8 is a view illustrating the outline of processing in which data of a conventional logical tape volume is written.

In general, when the data is written to the physical tape volume 60 in the back-end tape device 2, the data is added to the end of existing data stored in the physical tape volume 60. FIG. 8 illustrates an example in which a logical tape volume A of a plurality of logical tape volumes stored in the RAID device 213 is written to the physical tape volume 60.

Assume that three versions of the logical tape volumes A: A1, A2, and A3 have been written to the physical tape volume. In this state, when data of A4 which is a logical tape volume of the latest version is written to the physical tape volume 60, the data of A4 is added to the end of the existing data in the physical tape volume 60.

Figure 9:
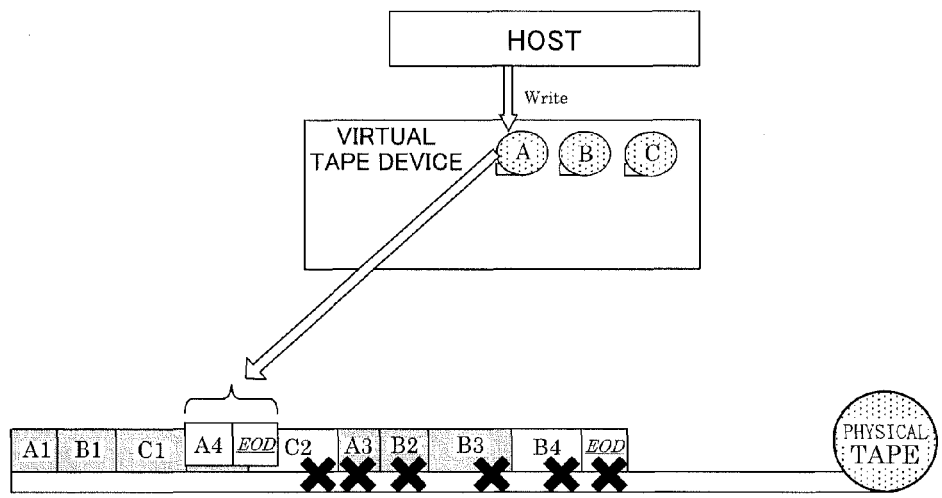
FIG. 9 is a view illustrating the outline of a case where data of a conventional logical tape volume is written in the middle of a physical tape volume.

If data of the latest version is written in the middle of the existing data (for example, A4 is written immediately behind C1) as illustrated in FIG. 9, the subsequent data including C2, A3, B2, . . . become unable to be read. Further, out of the logical tape volumes stored in the physical tape volume 60, those (colored in gray in FIGS. 8 and 9) other than the latest version are managed as invalid data.

As described above, in the case where the logical tape volume of the latest version is written in the state where the same logical tape volume of the old version has been written, data of the old version is managed as invalid data, so that if data update for the same logical tape volume is frequently performed, a large number of old data remain on the physical tape as invalid data. Thus, in an environment where data update for the same logical tape volume is frequently performed, a large number of invalid data exist on the physical tape volume, impeding effective use of the physical tape.

The invalid data recorded on the physical tape volume will be removed by reconstruction processing by which only valid data of the latest version is left in the physical tape volume. However, the reconstruction processing involves data migration between physical tape volumes, so that it takes long time to complete the processing.

The present embodiment has been made to solve the above problems, and an object thereof is to provide a technique that does not simply write new data at the end of the existing data stored in the physical tape volume but determines whether the existing data is valid or invalid based on the name of a logical volume to which the existing data belong or attribute thereof and, if the existing data to be determined is not valid, write new data starting from the starting position of the existing data for effective use of the physical tape volume.

An embodiment of the present invention will be described with reference to the accompanying drawings.

Figure 1:
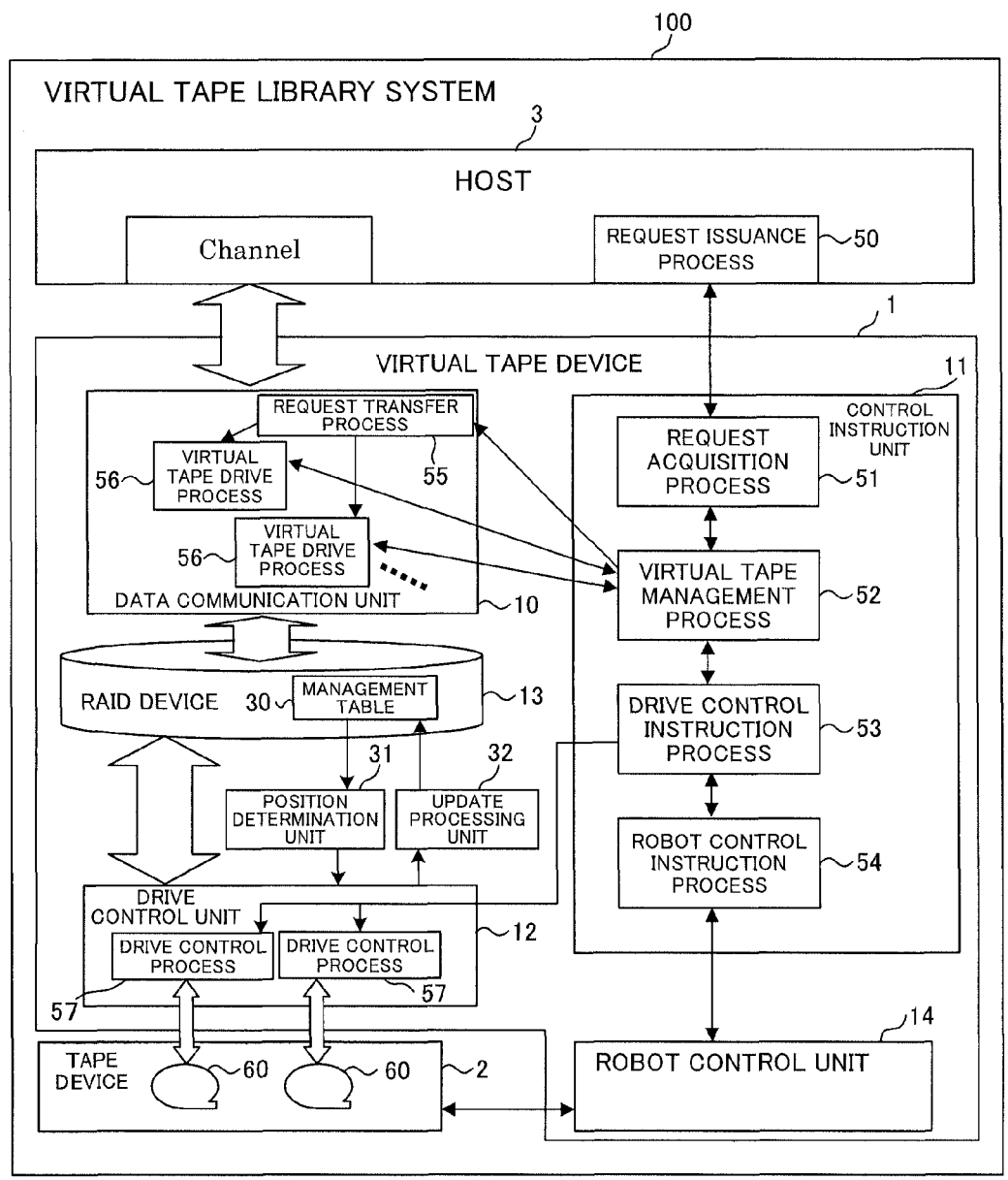
FIG. 1 is a view illustrating an example of a configuration of a virtual tape library system according to the present embodiment.

FIG. 1 illustrates a virtual tape library system according to the present embodiment. A virtual tape library system 100 includes a virtual tape device 1 (virtual tape apparatus), a tape device 2, and a host 3.

The virtual tape device 1 according to the present embodiment includes a RAID device 13 obtained by adding a management area to the conventional RAID device 213. The RAID device 13 retains, in the management area, a management table 30 for managing attribute information of data stored in the physical tape volume.

Further, the virtual tape device 1 includes a position determination unit 31 for determining the data write starting position referred to when data stored in the logical tape volume is written to the physical tape volume based on the attribute information in the management table 30.

In addition, the virtual tape device 1 includes an update processing unit 32 for updating the attribute information retained in the management table 30 when data write to the physical tape volume 60 is performed.

Although not equipped with the conventional drive control unit 212, a function of controlling the tape device 2 such that the data write starting position on the physical tape volume determined by the position determination unit 31 is sought is equipped with a drive control unit 12 of the present embodiment.

The units and processes other than the above are the same as those in the conventional virtual tape library system 200, and the descriptions thereof are omitted here (refer to FIG. 7). The position determination unit 31 and update processing unit 32 are each a server having hardware resources such as a CPU (Central Processing Unit), a memory, and the like. The processes communicate with one another between the servers using pipes and sockets to realize the virtual tape device 1.

The virtual tape device 1 according to the present embodiment does not simply write new data at the end of the existing data stored in the physical tape volume but writes new data starting from a position as close to the initial position of the physical tape volume as possible to minimize an occurrence of the invalid data for effective use of the physical tape. With this configuration, it is possible to reduce the frequency of the reconstruction processing that places a significant burden on the system.

Figure 2:
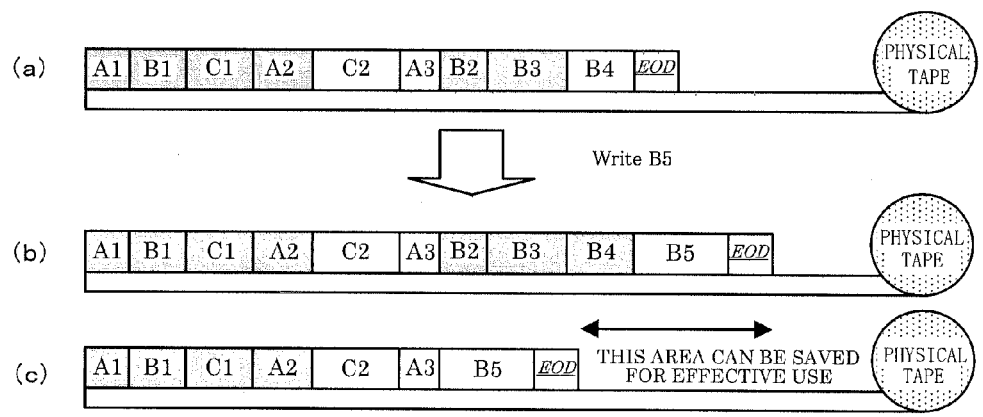
FIG. 2 is a view illustrating an example of the outline of data write processing to a physical tape in which end data is valid data.
Figure 3:
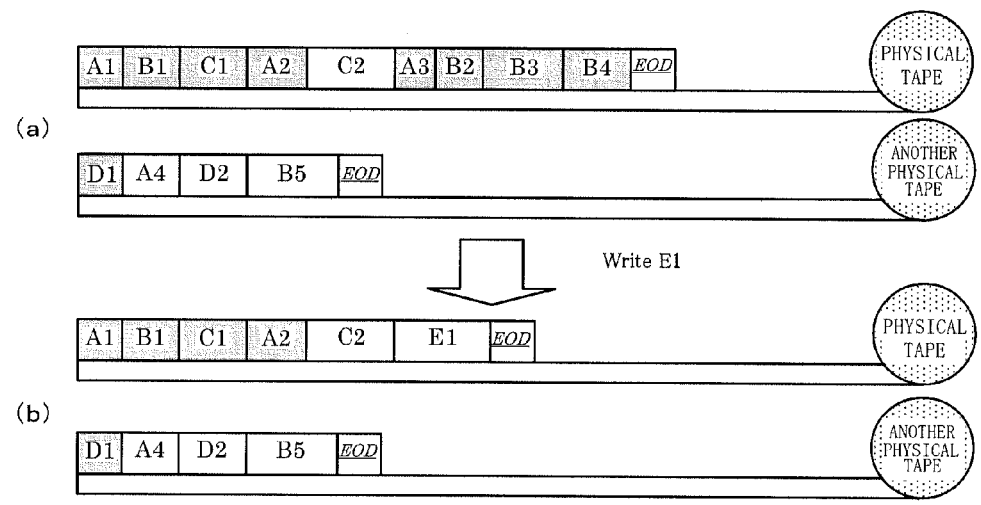
FIG. 3 is a view illustrating an example of the outline of data write processing to a physical tape in which end data is invalid data.

The outline of how the position determination unit 31 determines the data write position is illustrated in FIGS. 2 and 3. In FIG. 2, data of three logical tape volumes: a logical tape volume A, a logical tape volume B, and a logical tape volume C are retained in the RAID device 13, and data of these logical tape volumes are stored in a physical tape volume. In FIG. 3, data of four logical tape volumes: a logical tape volume A, a logical tape volume B, a logical tape volume C, and a logical tape volume D are retained in the RAID device 13.

The versions A1, A2, . . . B1, B2, . . . , etc. of the respective volumes are retained in the physical tape volume of FIGS. 2 and 3 (the larger number represents the newer version), and only the volume of the latest version is valid data, and volumes of older versions are invalid data.

First, a case where the latest version B5 of the logical tape volume B is written to the physical tape volume in which end data is valid data is illustrated in FIG. 2. Before writing of B5, A1, B1, C1, . . . , B3, B4, and EOD representing the end of data are stored in the physical tape volume in the order mentioned, as illustrated in FIG. 2 (*a*). Since the volume of the latest version is valid data, C2, A3, B4 are valid data and others are invalid data. In FIGS. 2 and 3, the volumes colored in gray represent invalid data, and volumes colored in white represent valid data.

A case where conventional write processing has been performed is illustrated in FIG. 2 (b). Data is written at the end of data stored in the physical tape volume in this conventional write processing, so that B5 is written immediately after B4. Thus, the writing of B5 invalidates the preceding data B4, B3, and B2.

The position determination unit 31 of the present embodiment determines which data in the physical tape volume is invalidated through the current write processing and determines the position immediately after valid data located at the endmost side of the physical tape as the write starting position. For example, in FIG. 2, the position determination unit 31 determines that out of the valid data C2, A3, and B4 which are volumes of the latest versions, B4 is invalidated through the current write processing of B5 as illustrated in FIG. 2 (c). Since B3 and B2 are invalid data, the position determination unit 31 determines the position immediately after the valid data A3 located at the endmost side of the physical tape as the write starting position.

With the above configuration, the storage area for data of B2, B3, and B4 can be saved as compared to the case of the conventional write processing of FIG. 2 (b), thereby achieving effective use of the physical tape.

FIG. 3 illustrates another case. In this case, two physical tape volumes are stored in the tape device 2. Further, in this case, logical tape volumes of the latest versions have been written in one physical tape volume which is not a write-target volume, so that the end data of the write-target physical tape volume is invalid data. As illustrated in FIG. 3 (a), since the logical tape volume B5 of the latest version has been written in the physical tape volume different from the write-target physical tape volume, data of B4 located at the end of the write-target physical tape volume has already been invalidated.

In the case where a logical tape volume E1 is written to the physical tape volume in which the end data is invalid data, the position determination unit 31 determines which data in the physical tape volume has already been invalidated and determines the position immediately after valid data located at the endmost side of the physical tape volume as the write starting position. That is, in the case of FIG. 3, the position determination unit 31 determines the data of A3, B2, B3, and B4 as invalid data and writes E1 immediately after C2 which is valid data written at the endmost side of the physical tape. As described above, the position determination unit 31 writes new data starting from a position as close to the initial position of the physical tape volume as possible under the condition that existing valid data that has already been stored in the physical tape volume is not located after the new data to thereby delete the invalid data. According to the present embodiment, the storage area for data of A3, B2, B3, and B4 can be saved as compared to the case of the conventional write processing in which E1 is written immediately after B4, thereby achieving effective use of the physical tape.

The attribute information according to the present embodiment stored in the management table 30 will be described with reference to FIGS. 4 and 5.

The management table 13 stores, as the attribute information of the logical tape volume stored in the physical tape volume, items of Status, logical volume name, Block number, size, time stamp, and version number. The Status indicates whether the logical tape volume is INVALID or VALID. The logical volume name is the identification name of the logical tape volume. The Block number indicates the position number of the logical tape volume counted from the beginning of the physical tape volume. The size indicates the size of the logical tape volume represented in units of bytes. The time stamp indicates the time at which the logical tape volume is written in the physical tape volume. The version number indicates the version number of the logical tape volume. The management table 13 is prepared for each physical tape volume.

FIG. 4 illustrates the management table in a state of FIG. 2 (a) (where the logical tape volume B5 of the latest version has not yet been written), and FIG. 5 illustrates the management table in a state of FIG. 2 (c) (where the logical tape volume B5 of the latest version has been written).

In the case where B5 whose version number is 5 is written at the position of B2 whose version number is 2 as illustrated in FIG. 2, the virtual tape device 1 of the present embodiment updates the Status of B4 (LV000B of version number 4) which had been the latest volume until B5 was registered in the management table 13 from VALID to INVALID. Further, the virtual tape device 1 gives the same Block number (Block number 20) as B2 (LV000B of version number 2) to B5, thereby establishing a state where the logical volume B5 of the latest version has been written at the position of B2. The update processing of the management table 30 is performed by the management table update processing unit 32.

Figure 6:
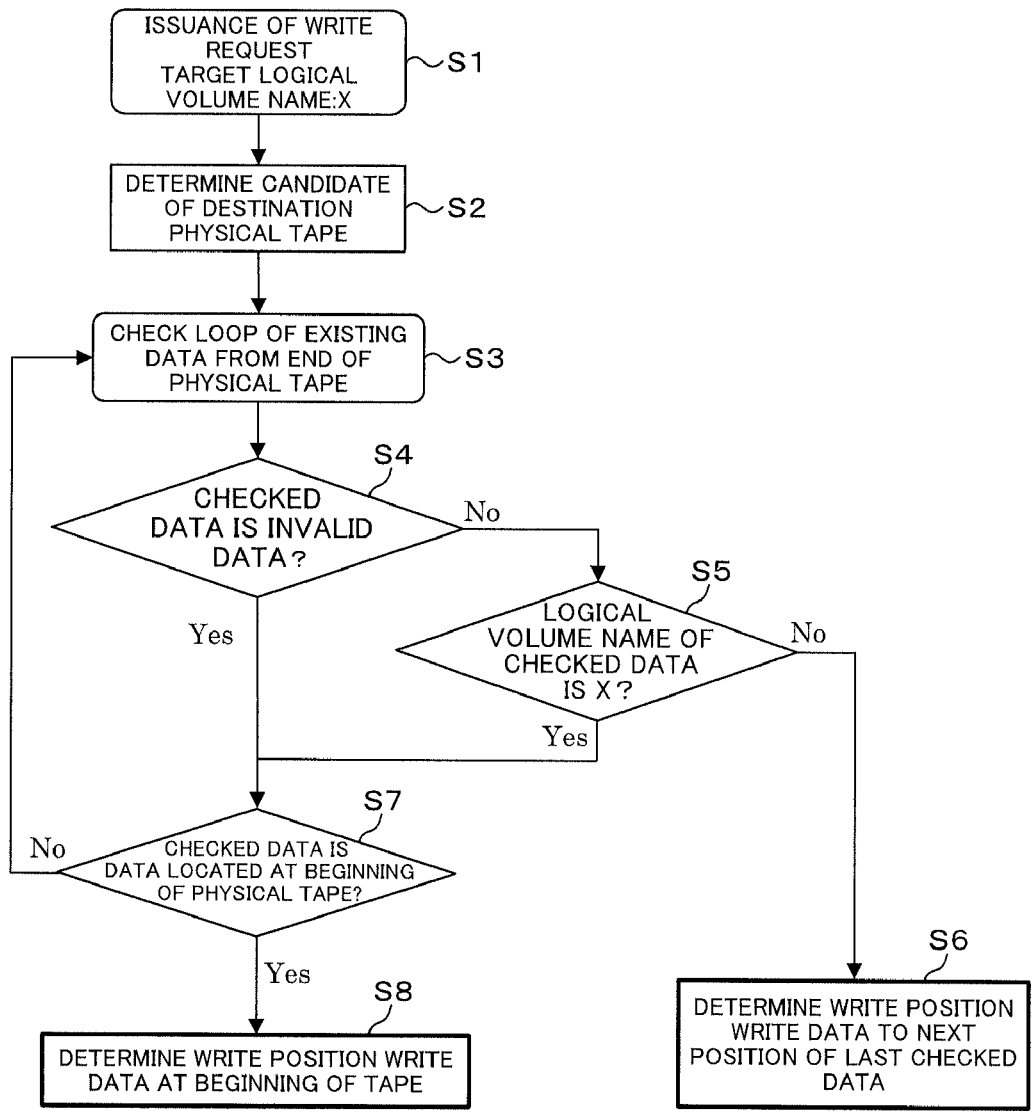
FIG. 6 is a flowchart illustrating processing performed in a virtual tape device according to the present embodiment.

Determination processing of the write position in the present embodiment will be described with reference to a flowchart illustrated in FIG. 6.

When a write request of a logical tape volume having a logical volume name of X (X is, e.g., LV000A, LV000B, or the like) is issued from the host 3 (step S1), the control instruction unit 11 determines a candidate of a destination physical tape volume and instructs the robot control unit 14 to use the determined physical tape volume (step S2).

After the destination physical tape volume is determined, the position determination unit 31 confirms the Block numbers retained in the management table 30 of the determined physical tape volume and performs the subsequent processing (steps S4, S5, and S7) in the descending order of the Block numbers (step S3).

The position determination unit 31 determines whether data of the currently checked logical tape volume is INVALID or not by referring to the Status in the management table 30 (step S4). If data of the currently checked logical tape volume is INVALID (Yes in step S4), the position determination unit 31 determines whether the data of the currently checked logical tape volume is data located at the beginning (beginning of an area in which user data can be written) of the physical tape from the Block number (step S7). If data of the currently checked logical tape volume is data located at the beginning (Yes in step S7), the position determination unit 31 determines the beginning of the tape volume as the write position, and the drive control unit 12 performs the write processing starting from the beginning of the tape volume (step S8).

If data of the currently checked logical tape volume is not data located at the beginning (No in step S7), the position determination section 31 returns the processing to step S3 and performs the same processing as above for data of the logical tape volume having second largest Block number.

Referring back to the determination processing of step S4, if data of the currently checked logical tape volume is not INVALID (No in step S4), the position determination unit 31 determines whether the logical volume name of the currently checked logical tape volume is identical to that of the logical tape volume to be written (step S5). If the logical volume name of the currently checked logical tape volume is identical to that of the logical tape volume to be written (Yes in step S5), the processing shifts to step S7. On the other hand, if not identical (No in step S5), the position determination unit 31 determines the next position (Block number) of the currently checked data as the write position, and the drive control unit 12 controls the tape device 2 such that the corresponding Block number is sought to thereby write the logical tape volume of the latest version to the sought Block number (step S6).

As described above, the virtual tape device 1 according to the present embodiment sequentially checks the data stored in the physical tape volume from the end of the physical tape volume and determines that checked data can be deleted as long as the invalid data continues. Further, even though the checked data is valid data, if the checked data is the same logical tape volume as the logical tape volume to be written, the virtual tape device 1 determines that the checked data can be deleted since the checked data is invalidated through the current write processing.

In the case where the data to be written is determined to be written at the beginning of the tape as a result of the check, the data to be written is not stored in the currently-targeted physical tape volume but may be stored in another physical tape volume. With this configuration, the reconstruction processing to be applied to the checked physical tape volume can be performed at high speed without data migration. At this time, the check processing is performed before the physical tape volume is mounted in the drive, thereby reducing unnecessary robot operation.

Although the management table 30 is retained in the RAID device 13 in the present embodiment, the management table 30 may be retained in, e.g., a not-illustrated non-volatile memory.

Further, although the description has been made about the write starting position on the physical tape in the present embodiment, the present embodiment is effective for a general storage medium including a write-once type recording medium like the physical tape.

A data reception section corresponds to the data communication unit 10 in the present embodiment, and a storage device and a storage section correspond to the RAID device 13 in the present embodiment. A write starting position determination section corresponds to the position determination unit 31 in the present embodiment, and a write processing section corresponds to the drive control unit 12. A management table update processing section corresponds to the update processing unit 32, and a library device corresponds to the tape device 2. A control section corresponds to the virtual tape device 1 in the present embodiment.

As described above, according to the present embodiment, it is possible to determine the data write position on the physical tape volume based on the attribute information of the logical tape volume so as to perform write processing of the logical tape volume.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention has(have) been described in detail, it should be understood that the various changes, substitutions, and alterations could be made hereto without departing from the spirit and scope of the invention.

What is claimed is:

1. A virtual tape apparatus interposed between a host and a library device that makes an access to a physical tape volume so as to store data transmitted from the host to a logical tape volume, the apparatus comprising:
    a data reception section that receives data transmitted from the host;
    a storage device having a logical tape volume for storing the data;
    a management table that retains attribute information of data stored in the physical tape volume;
    a write starting position determination section that determines the write starting position of the data stored in the logical tape volume on the physical tape volume, the write starting position determination section determining, out of data that have been written in the physical tape volume, data that has been invalidated and data to become invalidated through the current write processing based on the attribute information retained in the management table and determining the next position of valid data which is located at the endmost side among valid data stored in the physical tape volume as the write starting position; and
    a write processing section that writes data in the logical tape volume to the physical tape volume based on a result of the determination.

2. The virtual tape apparatus according to claim 1, wherein the write starting position determination section performs the determination of data that has been invalidated and data to become invalidated through the current write processing based on the attribute information retained in the management table with respect to the data stored in the physical tape volume in the order from the data on the end side of the physical tape volume and determines the next position of the endmost side valid data in the physical tape volume as the write starting position.

3. The virtual tape apparatus according to claim 2, wherein in the case where there is no valid data in the physical tape volume, the write starting position determination section determines the beginning position of an area in which user data can be written as the write starting position.

4. The virtual tape apparatus according to claim 3, further comprising a management table update processing section that updates the attribute information of the management table after the write processing performed by the write processing section.

5. A control method of a virtual tape apparatus interposed between a host and a library device that makes an access to a physical tape volume so as to store data transmitted from the host to a logical tape volume, the method comprising:
    receiving data transmitted from the host;
    storing the data in a storage device having a logical tape volume;
    determining the write starting position of the data stored in the logical tape volume on the physical tape volume; and
    writing data in the logical tape volume to the physical tape volume based on a result of the determination, wherein
    the determining of the write starting position determines, out of data that have been written in the physical tape volume, data that has been invalidated and data to become invalidated through the current write processing based on attribute information of data that have been written in the physical tape volume and determines the next position of the endmost side valid data in the physical tape volume as the write starting position.

6. The control method according to claim 5, wherein
the determining performs the determination of data that has been invalidated and data to become invalidated through the current write processing based on the attribute information with respect to the data stored in the physical tape volume in the order from the data on the end side of the physical tape volume and determines the next position of the endmost side valid data in the physical tape volume as the write starting position.

7. The control method according to claim 6, wherein
in the case where there is no valid data in the physical tape volume, the determining determines the beginning position of an area in which user data can be written as the write starting position.

8. The control method according to claim 7, further comprising updating the attribute information after the write processing of data to the physical tape volume.

9. A control section of an electronic device connected to a library device that makes an access to a physical tape volume so as to store data stored therein in the physical tape volume, the control section comprising:
 a management table that retains attribute information of data stored in the physical tape volume;
 a write starting position determination section that determines the write starting position of the data stored in a storage device having a logical tape volume on the physical tape volume, the write starting position determination section determining, out of data that have been written in the physical tape volume, data that has been invalidated and data to become invalidated through the current write processing based on the attribute information retained in the management table and determining the next position of the endmost valid data in the physical tape volume as the write starting position; and
 a write processing section that writes data in the logical tape volume to the physical tape volume based on a result of the determination.

10. The control section according to claim 9, wherein
the write starting position determination section performs the determination of data that has been invalidated and data to become invalidated through the current write processing based on the attribute information retained in the management table with respect to the data stored in the physical tape volume in the order from the data on the end side of the physical tape volume and determines the next position of the endmost side valid data in the physical tape volume as the write starting position.

11. The control section according to claim 10, wherein
in the case where there is no valid data in the physical tape volume, the write starting position determination section determines the beginning position of an area in which user data can be written as the write starting position.

12. The control section according to claim 11, further comprising a management table update processing section that updates the attribute information of the management table after the write processing performed by the write processing section.

* * * * *